（12）United States Patent
Nakane et al.

(10) Patent No.: US 10,762,401 B2
(45) Date of Patent: Sep. 1, 2020

(54) IMAGE PROCESSING APPARATUS CONTROLLING THE ORDER OF STORING DECOMPRESSED DATA, AND METHOD THEREOF

(71) Applicant: CANON KABUSHIKI KAISHA, Tokyo (JP)

(72) Inventors: Hiroyuki Nakane, Kashiwa (JP); Tatsunori Suzuki, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/705,096

(22) Filed: Sep. 14, 2017

(65) Prior Publication Data

US 2018/0082160 A1    Mar. 22, 2018

(30) Foreign Application Priority Data

Sep. 21, 2016 (JP) ................. 2016-184459

(51) Int. Cl.
*G06K 15/00* (2006.01)
*G06K 15/02* (2006.01)

(52) U.S. Cl.
CPC ....... *G06K 15/1857* (2013.01); *G06K 15/184* (2013.01); *G06K 15/1813* (2013.01); *G06K 15/1817* (2013.01); *G06K 15/1851* (2013.01); *G06K 2215/0045* (2013.01); *G06K 2215/0068* (2013.01)

(58) Field of Classification Search
CPC ............. G06K 15/1857; G06K 15/184; G06K 15/186; G06K 15/181
See application file for complete search history.

(56) References Cited

U.S. PATENT DOCUMENTS

| 6,778,292 B1 * | 8/2004 | Someno | G06K 15/02 358/1.15 |
| 8,111,419 B2 * | 2/2012 | Kudo | G06K 15/02 358/1.15 |
| 2010/0079809 A1 * | 4/2010 | Bellert | G06K 15/02 358/1.17 |

FOREIGN PATENT DOCUMENTS

| JP | 2012-158951 A | 8/2012 |
| JP | 2013-119242 A | 6/2013 |

* cited by examiner

*Primary Examiner* — Barbara D Reinier
(74) *Attorney, Agent, or Firm* — Canon U.S.A., Inc. IP Division

(57) ABSTRACT

A method for generating bitmap image data of a page includes acquiring print data of a page including compressed images, and performing rendering of bands included in the page based on the print data to generate the bitmap image data. The performing of the rendering performs rendering at least two of the bands concurrently. The performing of the rendering includes decompressing the compressed images, and using the decompressed images for corresponding bands of the bands to generate the bitmap image data. The decompressing decompresses, into a same memory area in a decompression buffer, at least two compressed images used for different bands, so that one of the two compressed images is decompressed into the same memory area and another of the two compressed images is decompressed, after rendering of a last band for which the one of the two compressed images is lastly used is finished, into the same memory area.

2 Claims, 15 Drawing Sheets

FIG. 8

|  | COMPRESSION SIZE | RAW SIZE | BoundingBox | BAND |
|---|---|---|---|---|
| A | 2.0 | 4.7 | {(30,10), (70,40)} | 1 |
| B | 3.0 | 3.5 | {(90,20), (130,50)} | 1 |
| C | 1.0 | 4.7 | {(150,50), (190,80)} | 1, 2 |
| D | 2.0 | 4.7 | {(90,70), (130,100)} | 2 |
| E | 2.0 | 4.7 | {(30,130), (70,160)} | 3 |
| F | 2.0 | 7.0 | {(90,140), (150,170)} | 3 |

FIG. 9

| | S705 | S706 | DECOMPRESSION BUFFER ADDRESS |
|---|---|---|---|
| A | (NO DECOMPRESSION BUFFER OBTAINED) | — | 0x00010000 |
| B | TRUE (A > B) | TRUE (OVERLAP WITH A) | 0x00020000 |
| C | TRUE (A = C) | TRUE (OVERLAP WITH A) | 0x00030000 |
| D | TRUE (A = C = D) | TRUE (ADJACENT TO A AND OVERLAP WITH C) | 0x00040000 |
| E | TRUE (A = C = D = E) | FALSE (NEITHER OVERLAP WITH A NOR ADJACENT TO A) | 0x00010000 |
| F | FALSE (A, B, C, D, E < F) | — | 0x00050000 |

FIG. 11

| | S1005 | S1006 | S1007 | DECOMPRESSION BUFFER ADDRESS |
|---|---|---|---|---|
| A | (NO DECOMPRESSION BUFFER OBTAINED) | — | — | 0x00010000 |
| B | TRUE (A > B) | TRUE (ON THE SAME LINE AS A) | — | 0x00020000 |
| C | TRUE (A = C) | FALSE (ON LINE DIFFERENT FROM A) | TRUE (STRIDE BANDS 1 AND 2) | 0x00030000 |
| D | TRUE (A = C = D) | FALSE (ON LINE DIFFERENT FROM A) | FALSE (ONLY Y BELONG TO BAND 2) | 0x00010000 |
| E | TRUE (A = C = D = E) | FALSE (ON LINE DIFFERENT FROM A) | FALSE (ONLY Y BELONG TO BAND 3) | 0x00010000 (0x00030000) |
| F | FALSE (A, B, C, D, E < F) | — | — | 0x00040000 |

1301 — RENDERING FRAME SETTING COMMAND
COLOR SPACE = RGB
GRAYSCALE = 8 BITS

1302 — RENDERING REGION SETTING COMMAND
WIDTH = 220 PIX
HEIGHT = 300 PIX

1303 — COMPRESSED IMAGE DECOMPRESSION COMMAND
COMPRESSION FORMAT = JPEG
DATA SIZE = 2000 BYTES
DATA LEADING ADDRESS = 0x0160E460
DECOMPRESSION BUFFER ADDRESS = 0x00010000
RAW SIZE = 4700 BYTES
DECOMPRESSION NUMBER = 1

1304 — COMPRESSED IMAGE DECOMPRESSION COMMAND
COMPRESSION FORMAT = JPEG
DATA SIZE = 3000 BYTES
DATA LEADING ADDRESS = 0x0160EC30
DECOMPRESSION BUFFER ADDRESS = 0x00020000
DATA SIZE OF IMAGE AFTER DECOMPRESSION = 3500 BYTES
DECOMPRESSION NUMBER = 2

1305 — RENDERING COMMAND
START COORDINATE = (30, 10)
COMBINING (TRANSPARENCY DESIGNATION) = NO
FILL TYPE = BITMAP FILL
DECOMPRESSION NUMBER = 1
PATH POINT SEQUENCE = (30, 10), (30, 40), (70, 40), (70, 10)

1306 — RENDERING COMMAND
START COORDINATE = (90, 20)
COMBINING (TRANSPARENCY DESIGNATION) = NO
FILL TYPE = BITMAP FILL
DECOMPRESSION NUMBER = 2
PATH POINT SEQUENCE = (90, 20), (90, 50), (130, 50), (130, 20)

1307 — COMPRESSED IMAGE DECOMPRESSION COMMAND
COMPRESSION FORMAT = JPEG
DATA SIZE = 1000 BYTES
DATA LEADING ADDRESS = 0x0160F7E8
DECOMPRESSION BUFFER ADDRESS = 0x00030000
DATA SIZE OF IMAGE AFTER DECOMPRESSION = 4700 BYTES
DECOMPRESSION NUMBER = 3

1308 — COMPRESSED IMAGE DECOMPRESSION COMMAND
COMPRESSION FORMAT = JPEG
DATA SIZE = 1000 BYTES
DATA LEADING ADDRESS = 0x0160F7E8
DECOMPRESSION BUFFER ADDRESS = 0x00010000
DATA SIZE OF IMAGE AFTER DECOMPRESSION = 4700 BYTES
DECOMPRESSION NUMBER = 4

1309 — RENDERING COMMAND
START COORDINATE = (150, 50)
COMBINING (TRANSPARENCY DESIGNATION) = NO
FILL TYPE = BITMAP FILL
DECOMPRESSION NUMBER = 3
PATH POINT SEQUENCE = (150, 50), (150, 80), (190, 80), (190, 50)

1310 — RENDERING COMMAND
START COORDINATE = (90, 70)
COMBINING (TRANSPARENCY DESIGNATION) = NO
FILL TYPE = BITMAP FILL
DECOMPRESSION NUMBER = 4
PATH POINT SEQUENCE = (90, 70), (90, 100), (130, 100), (130, 70)

1311 — COMPRESSED IMAGE DECOMPRESSION COMMAND
COMPRESSION FORMAT = JPEG
DATA SIZE = 1000 BYTES
DATA LEADING ADDRESS = 0x0160F7E8
DECOMPRESSION BUFFER ADDRESS = 0x00030000
DATA SIZE OF IMAGE AFTER DECOMPRESSION = 4700 BYTES
DECOMPRESSION NUMBER = 5

1312 — RENDERING COMMAND
START COORDINATE = (30, 130)
LEVEL COMBINING = NO
FILL TYPE = BITMAP FILL
DECOMPRESSION NUMBER = 5
PATH POINT SEQUENCE = (30, 130), (30, 160), (70, 160), (70, 130)

. . .

1313 — PAGE END COMMAND

FIG. 14A

| DECOMPRESSION NUMBER | 1 | 2 |
|---|---|---|
| MEMORY SIZE AFTER DECOMPRESSION | 4.7 | 3.5 |
| DECOMPRESSION BUFFER ADDRESS | 0×00010000 | 0×00020000 |
| REFERENCE STATE OF FIRST RENDERING PROCESSOR | REFERENCE | REFERENCE |
| REFERENCE STATE OF SECOND RENDERING PROCESSOR | NO REFERENCE | NO REFERENCE |

FIG. 14B

| DECOMPRESSION NUMBER | 1 | 2 |
|---|---|---|
| MEMORY SIZE AFTER DECOMPRESSION | 4.7 | 3.5 |
| DECOMPRESSION BUFFER ADDRESS | 0×00010000 | 0×00020000 |
| REFERENCE STATE OF FIRST RENDERING PROCESSOR | NO REFERENCE (REFERENCED) | NO REFERENCE (REFERENCED) |
| REFERENCE STATE OF SECOND RENDERING PROCESSOR | NO REFERENCE | NO REFERENCE |

FIG. 14C

| DECOMPRESSION NUMBER | 1 | 2 | 3 | 4 | 5 |
|---|---|---|---|---|---|
| MEMORY SIZE AFTER DECOMPRESSION | 4.7 | 3.5 | 4.7 | 4.7 | 4.7 |
| DECOMPRESSION BUFFER ADDRESS | 0×00010000 | 0×00020000 | 0×00030000 | 0×00010000 | 0×00010000 |
| REFERENCE STATE OF FIRST RENDERING PROCESSOR | NO REFERENCE (REFERENCED) | NO REFERENCE (REFERENCED) | NO REFERENCE (REFERENCED) | NO REFERENCE | REFERENCE |
| REFERENCE STATE OF SECOND RENDERING PROCESSOR | NO REFERENCE | NO REFERENCE | NO REFERENCE | REFERENCE | REFERENCE |

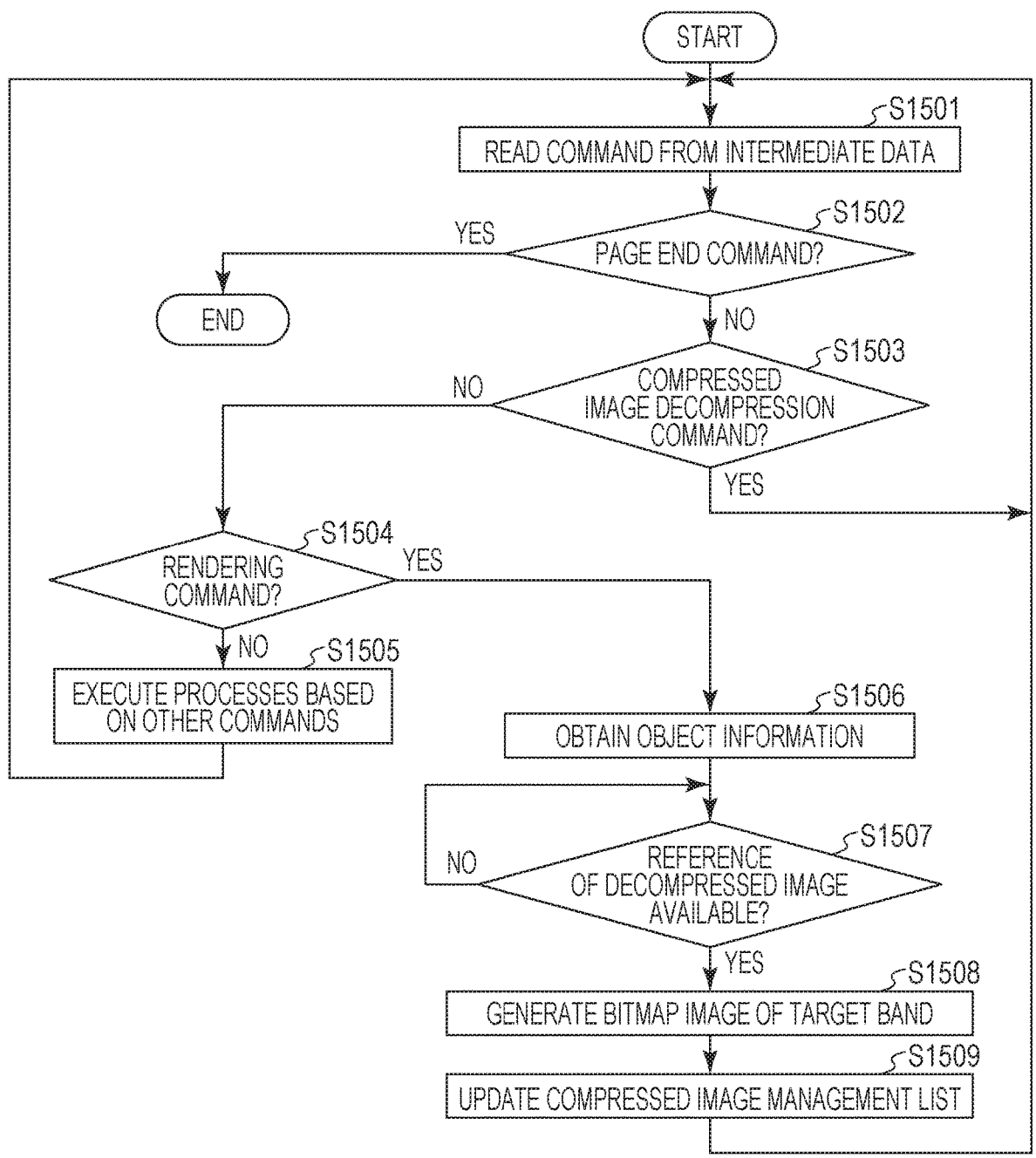

IMAGE PROCESSING APPARATUS CONTROLLING THE ORDER OF STORING DECOMPRESSED DATA, AND METHOD THEREOF

BACKGROUND OF THE INVENTION

Field of the Invention

The present disclosure relates to a technique of band parallel rendering performed on print data.

Description of the Related Art

In general, various techniques for achieving high speed rendering have been proposed. Japanese Patent Laid-Open No. 2012-158951, for example, discloses a technique of dividing print data (page description language (PDL) data) for one page into regions having a size which is smaller than the page and performing a rendering process in parallel on the individual regions using a plurality of renderers included in a multifunction peripheral (MFP). Furthermore, a scan line algorithm is generally used as one of rendering techniques. In the scan line algorithm, intermediate data is generated from PDL data and temporarily stored, and an image is formed in a unit of scan line while a color value of a target pixel is determined in accordance with the intermediate data. Furthermore, object compression is also used as a method for reducing a memory required for rendering. In the object compression, a compressed image is generated by performing lossless compression or lossy compression on an image defined by the PDL included in print data and a rendering image is generated by decompressing the compressed image where appropriate when an output image is formed by raster image processing (RIP).

When the scan line algorithm and the object compression are used in combination, all rendering images on scan lines are required to be decompressed in advance. A technique disclosed in Japanese Patent Laid-Open No. 2013-119242 is proposed as a technique of effectively using a region for decompressing a compressed image. Specifically, when intermediate data is generated, the same decompression buffer address (the same memory address) is associated with both of a compressed image in an upper portion of a page and a compressed image in a lower portion of the page so that a decompression destination buffer of the compressed image in the upper portion of the page is also used as a decompression destination buffer of the compressed image in the lower portion of the page. However, Japanese Patent Laid-Open No. 2013-119242 does not mention parallel rendering (particularly, band parallel rendering).

SUMMARY OF THE INVENTION

According to an embodiment of the present disclosure, a method for generating bitmap image data of a page includes acquiring print data of a page including compressed images, and performing rendering of a plurality of bands included in the page based on the acquired print data to generate the bitmap image data. The performing of the rendering performs rendering at least two of the plurality of bands concurrently. The performing of the rendering includes decompressing the compressed images into a decompression buffer, and using the decompressed images for corresponding bands of the plurality of bands to generate the bitmap image data. The decompressing decompresses, into a same memory area in the decompression buffer, at least two compressed images which are used for different bands, so that one of the at least two compressed images is decompressed into the same memory area and another of the at least two compressed images is decompressed, after rendering of a last band for which the one of the at least two compressed images is lastly used is finished, into the same memory area.

Further features of the present disclosure will become apparent from the following description of exemplary embodiments with reference to the attached drawings.

BRIEF DESCRIPTION OF THE DRAWINGS

FIG. 8 is a table illustrating image sizes and the positional relationships of image objects.

FIG. 9 is a table illustrating addresses of decompression buffers assigned to the image objects according to the first embodiment.

FIG. 11 is a table illustrating addresses of decompression buffers assigned to image objects according to the second embodiment.

FIG. 13 is a diagram illustrating a DL.

FIGS. 14A to 14C are diagrams illustrating a compressed image management list according to the second embodiment.

FIG. 15 is a flowchart illustrating a flow of a rendering process performed by a second rendering processor according to the second embodiment.

DESCRIPTION OF THE EMBODIMENTS

Embodiments of the present disclosure will be described hereinafter with reference to the accompanying drawings. Note that configurations in the embodiments below are merely examples, and the present technique is not limited to the illustrated configurations.

First Embodiment

Figure 1:
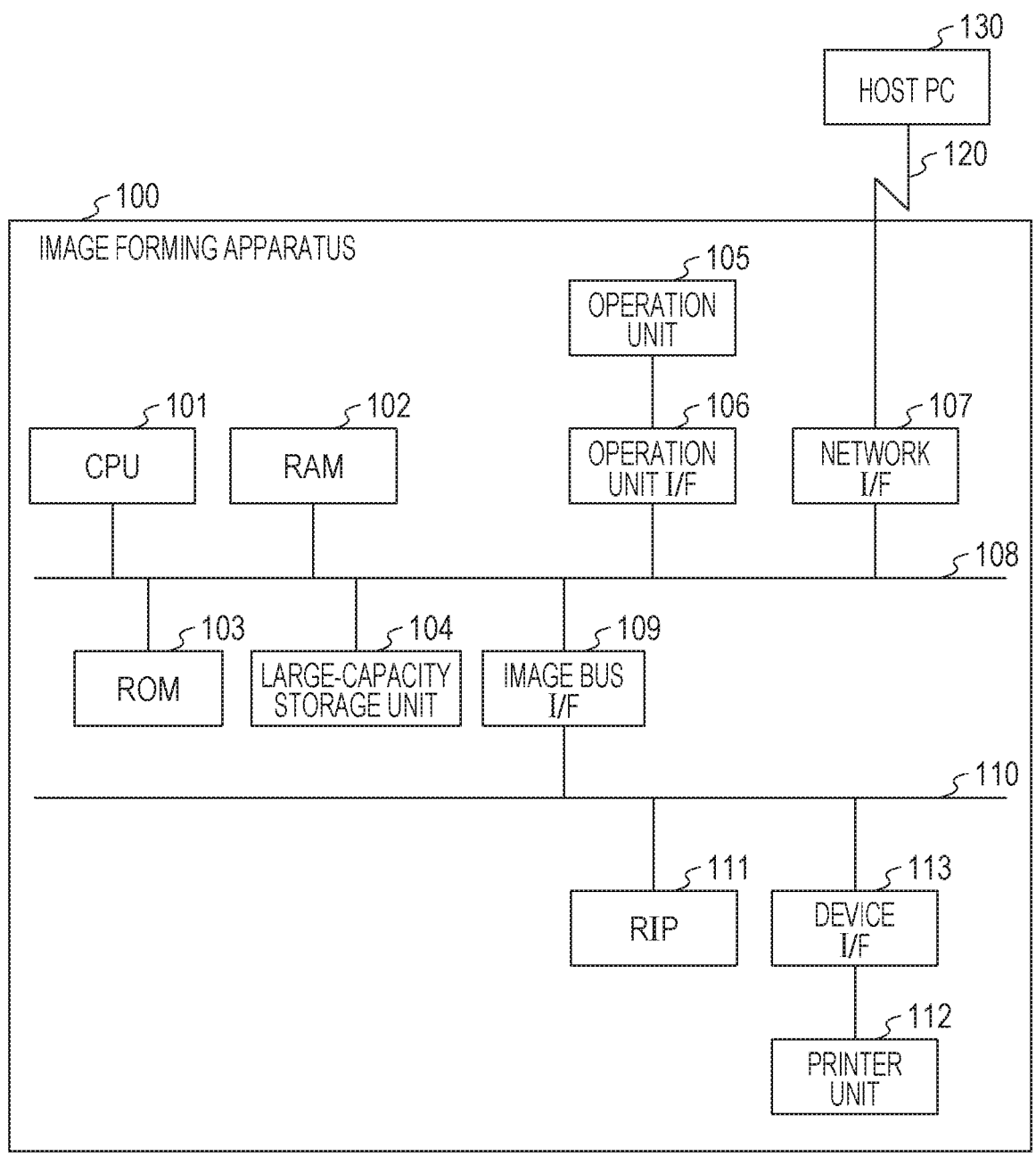
FIG. 1 is a diagram illustrating a hardware configuration of an image forming apparatus.

First, a hardware configuration of an image forming apparatus according to a first embodiment will be described. FIG. 1 is a diagram illustrating a hardware configuration of an image forming apparatus 100. The image forming apparatus 100 is connected to a host personal computer (PC) 130 through a local area network (LAN) 120. A user who desires to perform printing generates a print job of a document of a print target using the host PC 130 and transmits the print job from the host PC 130 to the image forming apparatus 100 through the LAN 120. The print job includes data (PDL data) which specifies arrangement of an object, such as a character, a photograph, or a diagram, in a page and which is described in the PDL. Therefore, the print job is also referred to as "print data". In this embodiment, it is assumed that a compressed image of a photograph object is included in a page of the PDL data. Furthermore, it is assumed here that the image forming apparatus 100 is a single function printer (SFP) which performs printing by performing parallel rendering on intermediate data in a unit of band. However, the image forming apparatus 100 may be a multifunction peripheral having a plurality of functions, such as a copy and a FAX. A method of this embodiment may be widely employed in any apparatus as long as the apparatus has a function of printing performed by parallel rendering in accordance with intermediate data in a unit of band (a printing unit). Hereinafter, components included in the image forming apparatus 100 of this embodiment will be described.

A central processing unit (CPU) 101 is a processor which performs various calculation processes and controls the entire image forming apparatus 100. A random access memory (RAM) 102 is a system work memory used when the CPU 101 operates. Furthermore, the RAM 102 is a work area used when intermediate data which is generated by interpreting PDL data included in a print job received from the host PC 130 is temporarily stored or when the intermediate data is used in a rendering process. A read only memory (ROM) 103 stores a boot program of a system and the like. A large-capacity storage unit 104 is a hard disk drive, for example, and stores system software for various processes and a print job supplied from the host PC 130.

An operation unit 105 includes a display which displays various menus, print data information, and the like and buttons and keys used by the user to perform various input operations, and is connected to a system bus 108 through an operation unit interface (I/F) 106.

A network I/F 107 is used for communication of transmission and reception of various data and various information with an external apparatus including the host PC 130 through the LAN 120. The units are connected to the system bus 108.

An image bus I/F 109 is used to connect the system bus 108 and an image bus 110 used to transfer image data at high speed to each other and is a bus bridge which converts a data structure. A raster image processor (RIP) 111 and a printer unit 112 are connected to the image bus 110.

The RIP 111 includes a plurality of processors, a memory, and a decompression process circuit and converts a display list (DL) which is intermediate data generated using the PDL data into image data of a raster format (bitmap image data). The printer unit 112 receives the bitmap image data generated by the RIP 111 through a device I/F 113 and forms an image to be output on a recording medium, such as a sheet. Note that a term "rendering" means generation of image data of a raster format using a DL which is intermediate data in this specification, and is equivalent to so-called "rasterizing".

Figure 2A:
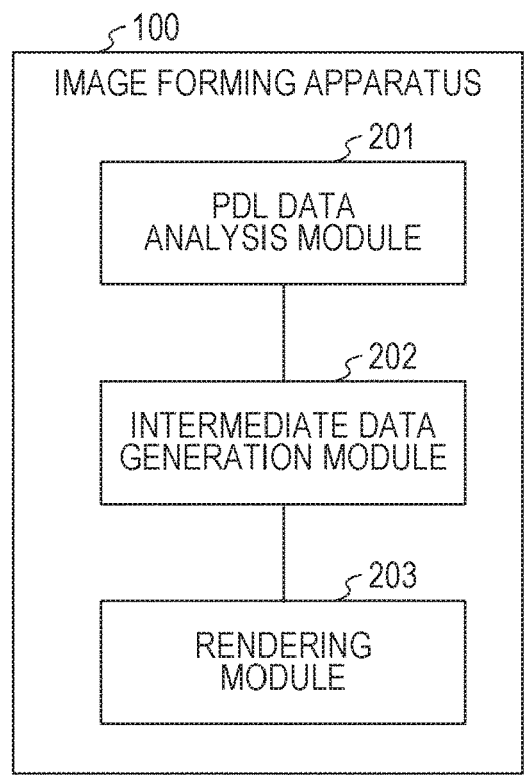
FIG. 2A is a block diagram illustrating a software configuration associated with a print process performed by the image forming apparatus.

FIG. 2A is a block diagram illustrating a software configuration associated with a print process performed by the image forming apparatus 100. The image forming apparatus 100 includes a PDL data analysis module 201, an intermediate data generation module 202, and a rendering module 203.

The PDL data analysis module 201 analyzes the PDL data included in the print job supplied from the host PC 130 so as to obtain object information. The object information includes attribute information, path shape information, operand information, and operator information. The attribute information indicates an attribute of an object, such as an image, a graphic, or text. The path shape information is information associated with a position and an outline of the object, such as object rendering range information (bounding box) and a path point sequence information representing the outline of the object by a point sequence. The operand information is information associated with rendering, such as a type of an operand of the object (such as "Image" or "FlatFill"), color information, and a color space (RGB or Gray, for example). The operator information is associated with a hierarchical layer (Raster Operation or the like) of the object. The obtained object information is supplied to the intermediate data generation module 202.

Figure 3A:
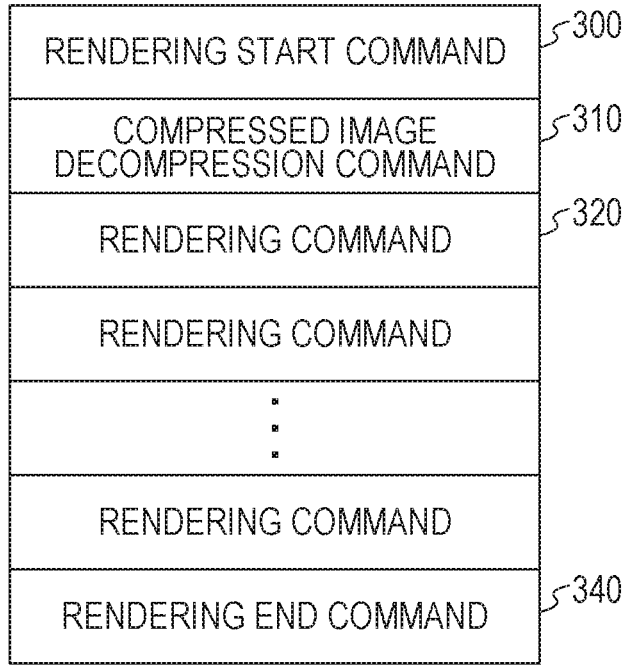
FIG. 3A is a diagram illustrating a data configuration of a display list (DL)
Figure 3B:
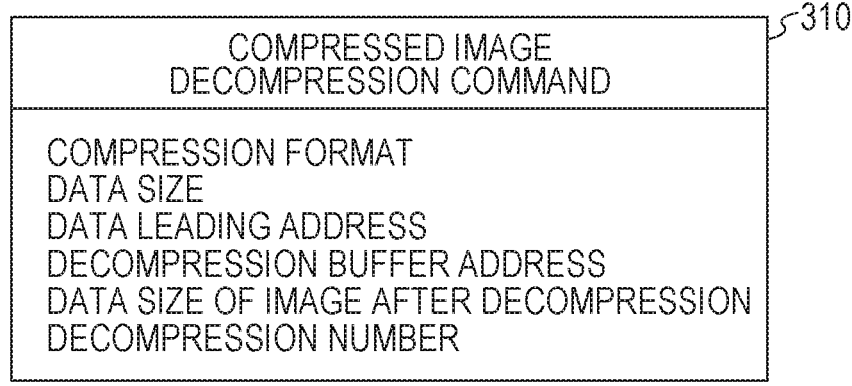
FIGS. 3B and 3C are diagrams illustrating a compressed image decompression command and a rendering command in detail, respectively.
Figure 3C:
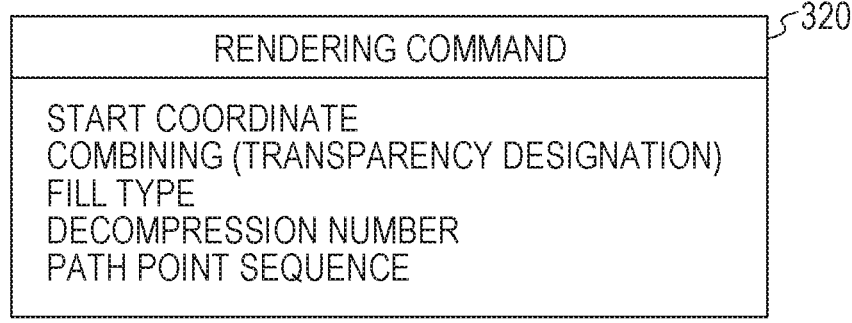

The intermediate data generation module 202 generates intermediate data (DL) based on page information and the object information supplied from the PDL data analysis module 201. The DL stands for a display list, and includes information on an edge of the object which is referred to as an "edge list". The edge list includes edge information associated with a start point and the outline of the object, level information associated with a vertical positional relationship among edges, and fill information associated with color of the object. Furthermore, when the object is a compressed image, the fill information includes information on an address of a memory region serving as a storage destination of the compressed image and information on an address of a decompression buffer which is a decompression destination of the compressed image. The intermediate data generation module 202 converts all objects included in the page into an edge list, sorts the edge list so that processing is performed in order of scan lines, and generates a DL by issuing a command (a compressed image decompression command, a rendering command, and the like) for an image forming process for each scan line. FIG. 3A is a diagram illustrating a data configuration of the DL. A rendering start command 300 is issued to start rendering of the page. A compressed image decompression command 310 is issued to the rendering module 203 serving as a renderer in advance to instruct decompression of a compressed image when the compressed image is rendered by a rendering command 320 which is to be subsequently issued. The compressed image decompression command 310 includes information on an address of a memory region which stores the compressed image and information on an address of a decompression buffer serving as a decompression destination. The rendering module 203 decompresses the compressed image in the specified decompression buffer in response to the command. The rendering command 320 is a rendering instruction command issued for each scan line. The rendering command 320 includes the edge information, the level information, and the fill information described above, and further includes information on an address of the decompression buffer serving as the decompression destination when a compressed image is to be processed. A process corresponding to the compressed image decompression command 310 is completed when the rendering module 203 processes the rendering command 320, and therefore, a RAW image obtained by decompressing the compressed image is stored in the decompression buffer. FIGS. 3B and 3C are diagrams illustrating the compressed image decompression command 310 and the rendering command 320, respectively, in detail. The compressed image decompression command 310 includes various information including a compression format for an image, such as JPEG, PNG, or the like, a data size of the compressed image before decompression, a data leading address which specifies a storage region for the compressed image, and a decompression destination buffer address which specifies a decompression destination of the compressed image. The rendering command 320 includes various information including a start scan line indicating a start point of an edge, a path point sequence indicating an outline of the edge, a level indicating the vertical relationship between edges, and a fill type indicating a type of a fill. When the fill type indicates a compressed image, the rendering command 320 includes information on a leading address after decompression.

Figure 4:
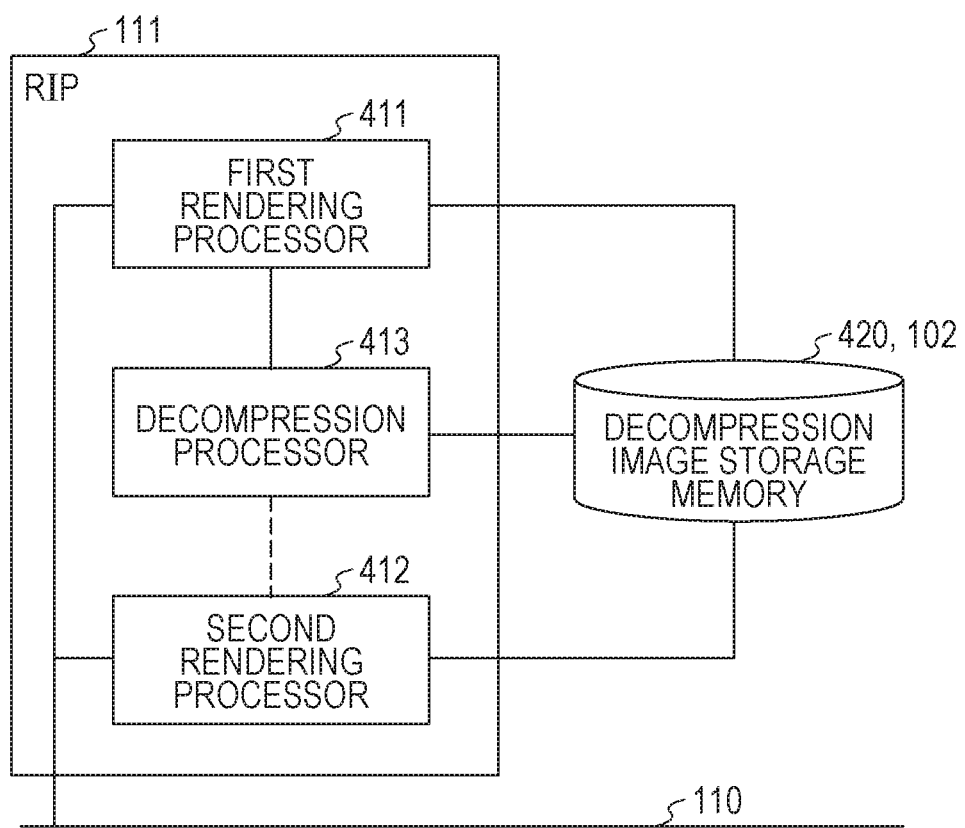
FIG. 4 is a hardware configuration of a raster image processor (RIP).

The rendering module 203 performs parallel rendering on individual bands based on the generated intermediate data so as to generate bitmap image data for each page. FIG. 4 is a diagram illustrating a hardware configuration of the RIP 111 of this embodiment which enables the rendering module 203 to perform the parallel rendering on individual bands. The RIP 111 includes a first rendering processor 411, a second rendering processor 412, and a decompression processor 413 which decompresses the compressed image included in the intermediate data in accordance with a decompression instruction supplied from the first rendering processor 411. RAW image data obtained after the decompression performed by the decompression processor 413 is stored in a decompressed image storage memory 420. Both of the first rendering processor 411 and the second rendering processor 412 may refer to the decompressed image storage memory 420 and obtain RAW image data from the decompressed image storage memory 420 at respective appropriate timings. Furthermore, the decompression processor 413 includes a register (not illustrated) inside thereof which stores the number of times the decompression process is completed in response to decompression commands among received decompression commands (the number of decompressed images). A numerical value stored in the internal register is initialized to 0 every time a process for one page is terminated. The value of the internal register may be referenced by both of the first rendering processor 411 and the second rendering processor 412. Furthermore, the number of times the decompression process is completed may be stored in a certain region of the decompressed image storage memory 420 instead of the internal register. The first rendering processor 411 and the second rendering processor 412 generate bitmap images of objects in accordance with the edge information and the fill information included in the DL.

Note that it is assumed in this embodiment that the PDL data analysis module 201 and the intermediate data generation module 202 are realized by the CPU 101 using the RAM 102 in accordance with predetermined programs. However, an entire process from the analysis of the PDL data to the generation of the bitmap image data may be performed in a closed configuration of the RIP 111. Furthermore, although the RAM 102 is used as the decompressed image storage memory 420 in this embodiment, a memory dedicated for storing decompressed images may be provided separately from the RAM 102. Moreover, although the band parallel rendering is performed using the two rendering processors in this embodiment, the number of rendering processors may be three or more.

Explanation of Terms

Here, the terms "edge", "scan line", "span", "level", "fill", and "band" used in the rendering process of this embodiment is described again.

The term "edge" indicates a boundary between objects included in a page or a boundary between an object and a background. Specifically, the term "edge" indicates an outline of an object.

The term "scan line" indicates a line in a main scanning direction of memory scan in which image data is consecutively scanned in an image forming process. A height of the scan line is 1 pixel. A plurality of scan lines are collected to be a "band".

The term "span" indicates an interval between edges in a single scan line. This interval is also referred to as a "closed region".

The term "level" indicates information representing the vertical relationship between objects rendered in a page. Different level numbers are assigned to different objects. The term "level" is also referred to as "Z order" which indicates order of arrangement of objects in a direction from a back surface to a front surface of a page (a direction orthogonal to an XY plane when a page rendering range is represented as the XY plane: a Z direction).

The term "fill" indicates information on a fill in a span. Examples of the fill include a fill having different color values in different pixels, such as bitmap image data or shading, and a fill having a color value which is not changed in a span, such as solid coloring. Accordingly, a number of levels corresponding to the number of objects associated with a target span are included in the single span (closed region) and different fills corresponding to the number of levels are included in the single span.

Figure 2B:
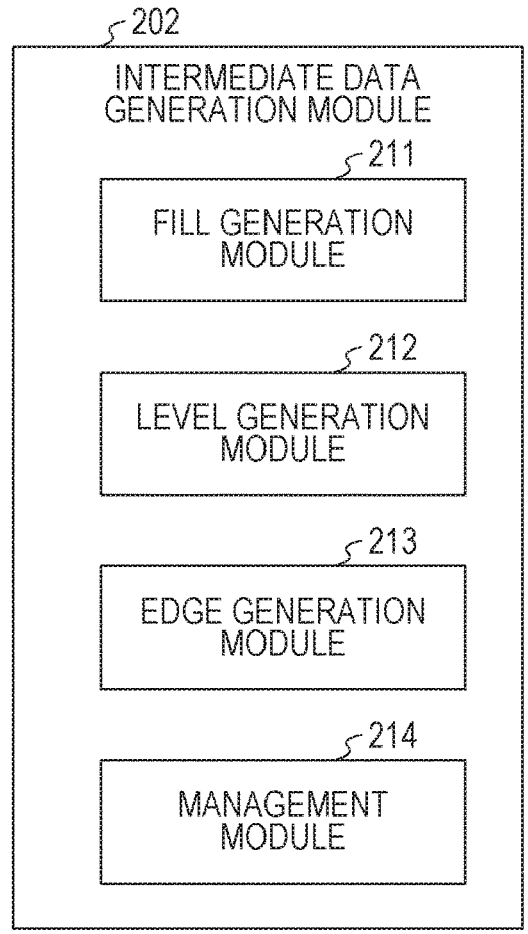
FIG. 2B is a diagram illustrating an internal configuration of an intermediate data generation module.

Next, the intermediate data generation module 202 will be described in detail. FIG. 2B is a diagram illustrating an internal configuration of the intermediate data generation module 202. The intermediate data generation module 202 includes four sub-modules in total including a fill generation module 211, a level generation module 212, an edge generation module 213, and a management module 214.

The fill generation module 211 generates fill information using operand information. When an image object included in a page to be printed is a compressed image, the fill generation module 211 secures a decompression buffer for decompression of the compressed image at a time of rendering. In the general techniques, different decompression buffers are secured for different compressed images. In this embodiment, a number of decompression buffers are used in a shared manner while parallelism of the rendering module 203 is ensured so that reduction of a memory for the decompression buffers is realized. A method for using decompression buffers in a shared manner will be described hereinafter.

The level generation module 212 generates level information using operator information. Examples of the level information include information on an object disposed in a page represented by a Z-order amount (a value in a Z direction which is orthogonal to X and Y directions) and information on overlapping between objects. For example, an object in a level 1 is rendered over an object in a level 0.

The edge generation module 213 generates edge information using path shape information. Furthermore, the management module 214 registers various information generated by the fill generation module 211, the level generation module 212, and the edge generation module 213 in the DL.

Figure 5:
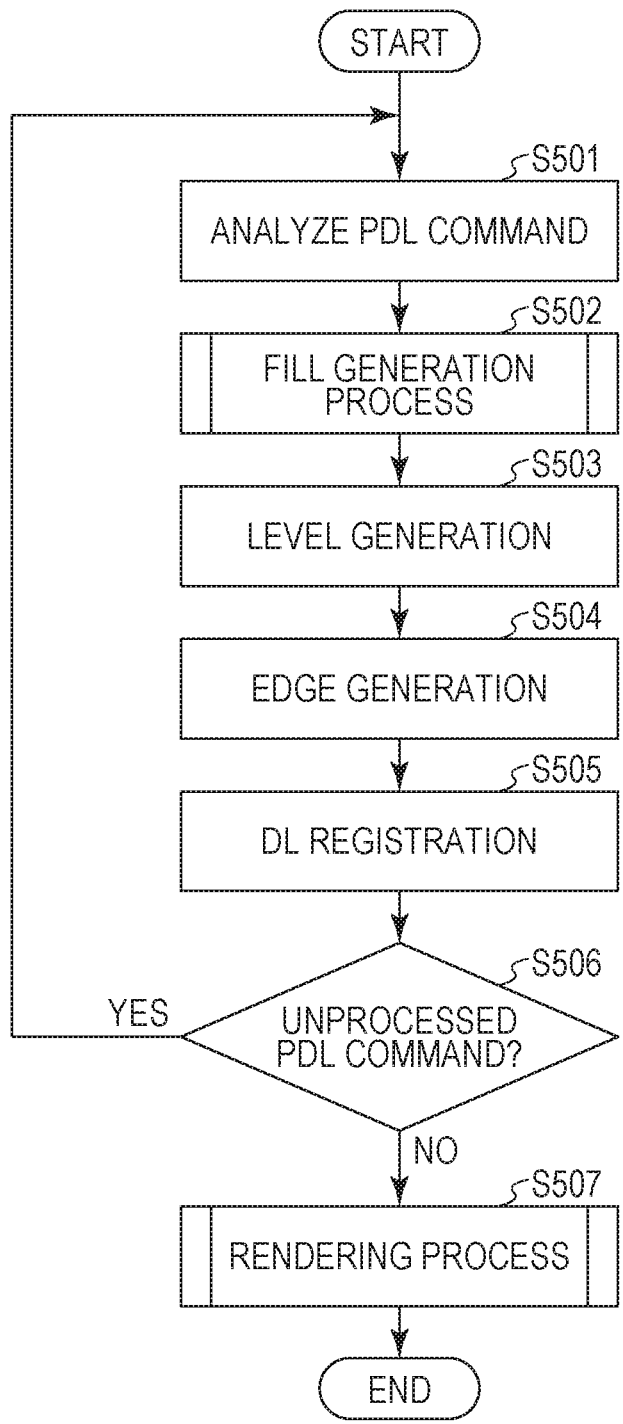
FIG. 5 is a flowchart illustrating a flow of generation of map image data from a print job.
Figure 6:
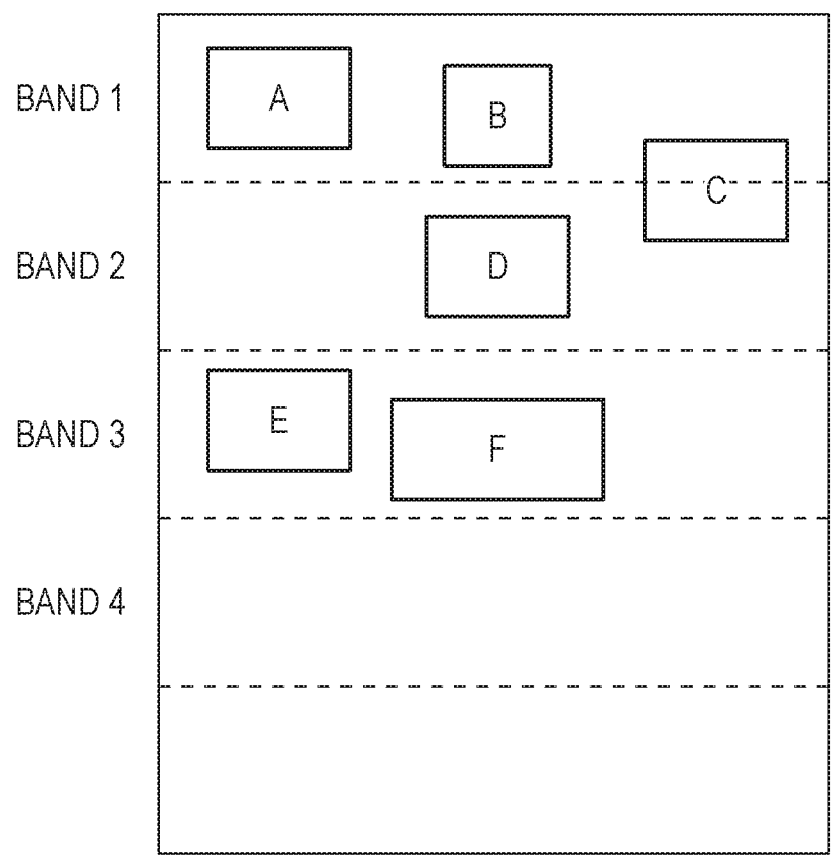
FIG. 6 is a diagram illustrating PDL data of a page including compressed images.

Next, a flow of a process of generating bitmap image data using a print job will be briefly described. FIG. 5 is a flowchart of a flow of generation of bitmap image data using a print job. A series of processes is realized when a program stored in the ROM 103 is developed in the RAM 102 and the CPU 101 executes the program. Hereinafter, it is assumed that a print job including PDL data of a page including image objects A to F arranged therein as illustrated in FIG. 6 is transmitted from the host PC 130. Dotted lines in FIG. 6 denote boundaries of bands which are processing units of the rendering module 203. It is assumed in this embodiment that a width of a page is 220 pixels, a height is 300 pixels, and a band includes 60 scan lines. Note that, in a case of this embodiment, division of data of a print job for the purpose that the rendering process is performed in parallel in step S507 described below is not performed in advance.

The print job supplied from the host PC 130 is first stored in the RAM 102 or the large-capacity storage unit 104. In step S501, the PDL data analysis module 201 reads and analyzes a PDL command to be processed (a target PDL command) from the PDL data included in the stored print job so as to obtain the object information described above.

In step S502, the fill generation module 211 of the intermediate data generation module 202 generates fill information using the obtained object information corresponding to the target PDL command. A process of generating fill information will be described in detail hereinafter.

In step S503, the level generation module 212 generates level information using the operator information. As the level information, a level is determined in principle in processing order of objects taking raster operation (ROP) information and the like included in the operator information into consideration.

In step S504, the edge generation module 213 generates edge information using the path shape information. The edge information is constituted by a link configuration of a link between the fill information (including a storage destination of the compressed image and information on an address of a decompression destination) generated in step S502 and level information generated in step S503.

In step S505, the management module 214 registers the various information generated in step S503 and step S504 in the DL as an edge list.

In step S506, it is determined whether an end of PDL commands in the received PDL data has been reached. When the end has not been reached, the process returns to step S501 and the process is performed again on an unprocessed command. In this way, the DL is generated in a unit of page. On the other hand, when the end has been reached, the process proceeds to step S507.

In step S507, the rendering module 203 analyzes the DL generated in a unit of page using the RIP 111 in response to an instruction issued by the CPU 101 so as to generate bitmap image data. In this case, in the RIP 111, the first rendering processor 411 and the second rendering processor 412 generate bitmap image data of respective bands in the DL of the processing target page in parallel.

The flow of the process of generating bitmap image data using a print job has been briefly described above.

Figure 7:
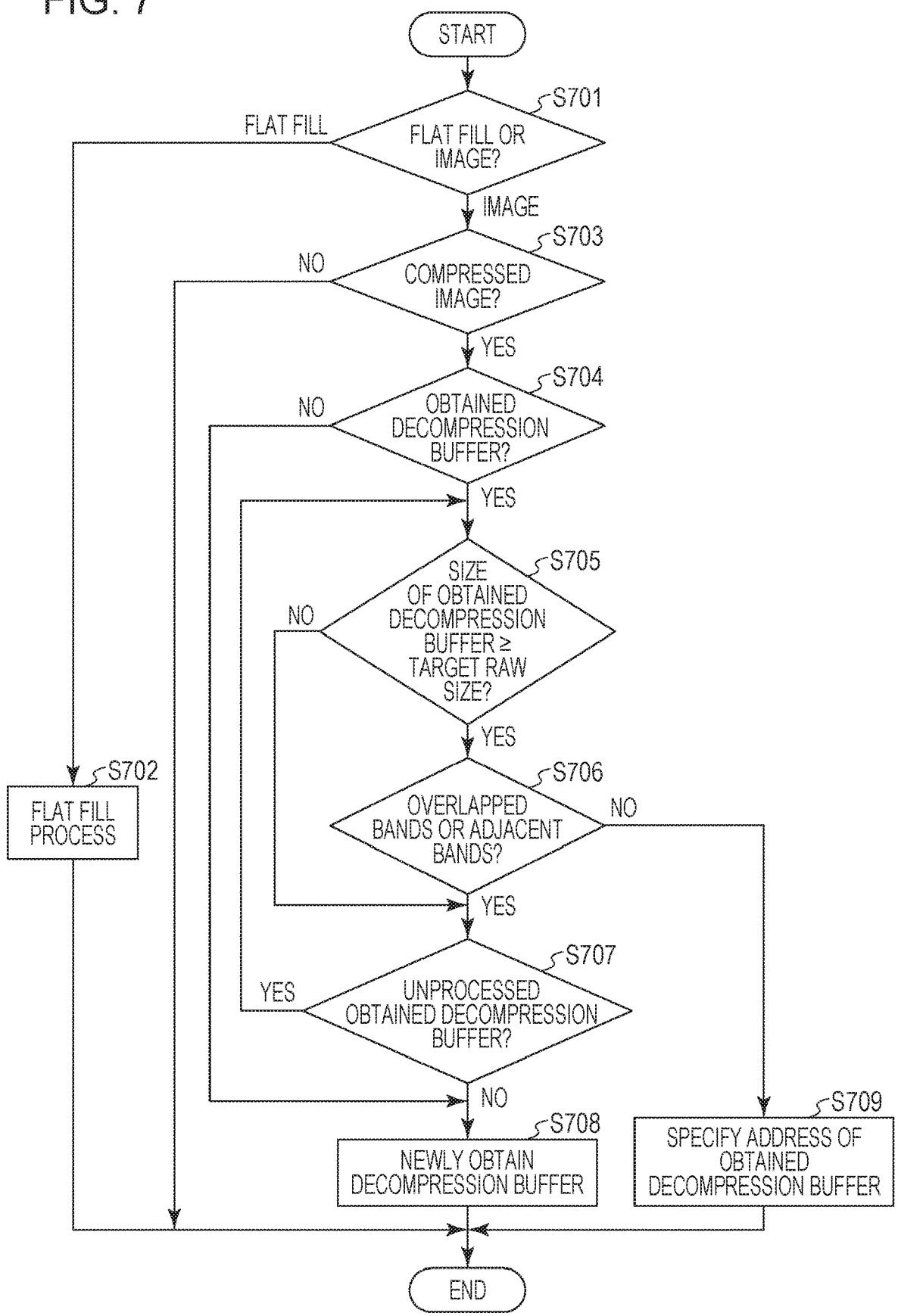
FIG. 7 is a flowchart illustrating a fill information generation process in detail according to a first embodiment.

Next, a method for assigning a decompression buffer which is a characteristic of this embodiment will be described. The assignment of a decompression buffer is performed in the fill information generation process. FIG. 7 is a flowchart illustrating the fill information generation process in detail.

In step S701, it is determined whether a fill of an object associated with a target PDL command is "FlatFill" (solid coloring) or an image with reference to the operand information included in the object information. As a result of the determination, when the fill is a flat fill, the process proceeds to step S702 where a color value specified in "FlatFill" is set as fill information, and this process is terminated. On the other hand, when the fill is an image, the process proceeds to step S703.

In step S703, it is determined whether the image is a compressed image. As a result of the determination, when the image is an uncompressed RAW image, the RAW image is set as the fill information before this process is terminated. On the other hand, when the image is a compressed image, the process proceeds to step S704. In the case of the page in FIG. 6, all the six objects are compressed images, and therefore, the process proceeds to step S704.

In step S704, it is determined whether a decompression buffer has been obtained. When the determination is affirmative, the process proceeds to step S705, and otherwise, the process proceeds to step S708.

In step S705, a size of the obtained decompression buffer is compared with a size of an image obtained by decompressing the compressed image associated with the target PDL command (hereinafter referred to as a "target RAW size". When a plurality of decompression buffers have been obtained, a size of each of the obtained decompression buffers is compared with the target RAW size. As a result of the comparison, when the size of the obtained decompression buffer is equal to or larger than the target RAW size, the process proceeds to step S706. On the other hand, when the target RAW size is larger than the size of the obtained decompression buffer, the process proceeds to step S707.

In step S706, it is determined whether a band to which a compressed image corresponding to the obtained decompression buffer belongs overlaps with or is adjacent to a band to which the compressed image associated with the target PDL command (hereinafter referred to as a "target compressed image) belongs. When the determination is affirmative, the process proceeds to step S707. On the other hand, when the determination is negative, the process proceeds to step S709.

In step S707, it is determined whether at least one decompression buffer has been unprocessed. When the determination is affirmative, the buffer is determined as an obtained decompression buffer of a next comparison target, and the comparison with the target RAW size is performed again. When the determination is negative, the process proceeds to step S708.

In step S708, a memory region for decompression of the target compressed image is secured by the target RAW size, and an address of the secured memory region is specified as an address of a decompression buffer for the target compressed image.

In step S709, an address of the obtained decompression buffer corresponding to the negative determination in step S706 is specified as an address of a decompression buffer for decompression of the target compressed image. Specifically, the same memory region is shared as a decompression buffer for the two compressed images.

Here, the fill information generation process of this embodiment will be described using a concrete example. FIG. 8 is a table of image sizes and the positional relationships of the six image objects A to F illustrated in FIG. 6. In the table of FIG. 8, a term "compression size" indicates data sizes of the image objects A to F which are compressed images, and the sizes are obtained using the operand information. A term "RAW size" indicates data sizes after decompression of the compressed images. The RAW size is calculated using a width, a height, and a color space (the number of bits) of a decompressed image. Note that a unit of an image size is KB. A term "BoundingBox" indicates a rendering region of an object and is obtained using the path shape information. A term "band" indicates a number of a band to which a rendering region specified by "Bounding-Box" belongs. For example, the object C strides bands 1 and 2, and therefore, 1 and 2 which are numbers of the bands are described. Hereinafter, the image objects are denoted by "Obj_A" to "Obj_F" for convenience of explanation.

First, a preceding image object does not exist for the leading image object Obj_A (No in step S704), and therefore, a memory region corresponding to a RAW size of 4.7 KB is newly secured and an address (0x00010000) of a decompression buffer for Obj_A is specified.

Subsequently, in a case of Obj_B, the decompression buffer has been obtained for the preceding object Obj_A (Yes in step S704), and therefore, a size of the decompression buffer (4.7 KB) is compared with a RAW size of Obj_B, that is, 3.5 KB (step S705). As a result of the comparison, the size of the obtained decompression buffer is larger (Yes in step S705), and therefore, it is determined whether a band to which Obj_A corresponding to the obtained decompression buffer belongs overlaps with or is adjacent to a band to which Obj_B belongs (step S706). In this case, both of the objects belong to the band 1, and therefore, the bands overlap with each other (Yes in step S706). Since an unprocessed obtained decompression buffer does not exist (No in step S707), a memory region corresponding to the RAW size of Obj_B, that is, 3.5 KB is newly obtained and an address (0x00020000) of a decompression buffer for Obj_B is specified (step S708).

Subsequently, in a case of Obj_C, the decompression buffers have been obtained for the preceding objects Obj_A and Obj_B (Yes in step S704), and therefore, first, the size of the decompression buffer for Obj_A (4.7 KB) is compared with a RAW size of Obj_C, that is, 4.7 KB (step S705). As a result of the comparison, both of the sizes are equal to each other (Yes in step S705), and therefore, it is determined whether the band to which Obj_A corresponding to the obtained decompression buffer belongs overlaps with or is adjacent to a band to which Obj_C belongs (step S706). In this case, a portion of Obj_C belongs to the band 1, and therefore, the bands overlap with each other (Yes in step S706). Thereafter, since the decompression buffer for the preceding object Obj_B has been obtained (Yes in step S707), the size of the decompression buffer (3.5 KB) is compared with the RAW size of Obj_C, that is, 4.7 KB again (step S705). In this case, the size of the obtained decompression buffer is smaller, and therefore, the process proceeds to step S707. However, an unprocessed obtained decompression buffer does not exist anymore, and therefore, the process proceeds to step S708. Then a memory region corresponding to the RAW size of Obj_C, that is, 4.7 KB is newly secured and an address (0x00030000) of a decompression buffer for Obj_C is specified.

Subsequently, in a case of Obj_D, the decompression buffers have been obtained for the preceding objects Obj_A to Obj_C (Yes in step S704), and therefore, first, the size of the decompression buffer for Obj_A (4.7 KB) is compared with a RAW size of Obj_D, that is, 4.7 KB (step S705). As a result of the comparison, both of the sizes are equal to each other, and therefore, the process proceeds to step S706 (Yes in step S705). The band 1 to which Obj_A belongs corresponding to the obtained decompression buffer is adjacent to the band 2 to which Obj_D belongs, and therefore, the process proceeds to step S707 (Yes in step S706). Thereafter, the size of the unprocessed decompression buffer of Obj_B (3.5 KB) is compared with the RAW size of Obj_D (4.7 KB) (step S705). In this case, the size of the obtained decompression buffer is smaller, and therefore, the process proceeds to step S707 (No in step S705). Thereafter, the size of the unprocessed decompression buffer of Obj_C (4.7 KB) is compared with the RAW size of Obj_D (4.7 KB) (step S705). As a result of the comparison, both of the sizes are equal to each other, and therefore, the process proceeds to step S706 (Yes in step S705). In this case, a portion of Obj_C belongs to the band 2, and therefore, the bands overlap with each other (Yes in step S706). Although the process proceeds to step S707 again, an unprocessed obtained decompression buffer does not exist anymore, and therefore, the process proceeds to step S708. Then a memory region corresponding to the RAW size of Obj_D, that is, 4.7 KB, is newly secured and an address (0x00040000) of a decompression buffer for Obj_D is specified.

Subsequently, in a case of Obj_E, the decompression buffers have been obtained for the preceding objects Obj_A to Obj_D (Yes in step S704), and therefore, first, the size of the decompression buffer of Obj_A (4.7 KB) is compared with a RAW size of Obj_E, that is, 4.7 KB (step S705). As a result of the comparison, both of the sizes are equal to each other, and therefore, the process proceeds to step S706 (Yes in step S705). The band 1 to which Obj_A belongs corresponding to the obtained decompression buffer is different from a band 3 and is not adjacent to the band 3 to which Obj_E belongs, and therefore, the process proceeds to step S709 (No in step S706). As a result, the address of the decompression buffer for Obj_A (0x00010000) is specified as an address of a decompression buffer for Obj_E.

Lastly, in a case of Obj_F, the decompression buffers have been obtained for the preceding objects Obj_A to Obj_E (Yes in step S704), and therefore, first, the size of the decompression buffer of Obj_A (4.7 KB) is compared with a RAW size of Obj_F, that is, 7.0 KB (step S705). As a result of the comparison, the RAW size of Obj_F is larger (No in step S705), and therefore, the process proceeds to step S707. Thereafter, although the same process is performed on the remaining objects Obj_B to Obj_E, the obtained decompression buffer sizes do not equal to or larger than the RAW size of Obj_F, and therefore, the process proceeds to step S708. Then a memory region corresponding to the RAW size of Obj_F, that is, 7.0 KB, is newly secured and an address (0x00050000) of a decompression buffer for Obj_F is specified.

The description above is summarized in a table of FIG. 9. Although the decompression buffers are newly secured for Obj_A to obj_D and Obj_F, the address of the decompression buffer for Obj_A is also specified for Obj_E. Accordingly, the same memory region is used in a shared manner.

According to this embodiment, a decompression buffer for a target compressed image is shared by another compressed image which belongs to a band which does not overlap with or is not adjacent to a band to which the target compressed image belongs. Accordingly, the decompression buffer may be used in a shared manner at maximum while a plurality of rendering processors do not enter a waiting state caused by conflict.

Second Embodiment

In the first embodiment, the memory saving method in which the minimum number of decompression buffers is used while the parallelism of the band parallel rendering is maximized is described. Next, an embodiment for enhancing a memory reduction rate while the parallelism of the band parallel rendering is reduced will be described as a second embodiment. Note that descriptions of components which are the same as those in the first embodiment are omitted or simplified, and different points are mainly described hereinafter.

In this embodiment, the memory reduction rate is improved when compared with that of the first embodiment by sharing a decompression memory while a decompression timing is controlled by a rendering module 203. Basic configurations of hardware and software of an image forming apparatus 100 are the same as those of the first embodiment. Hereinafter, a fill information generation process characterized by this embodiment will be described in detail with reference to a flowchart of FIG. 10.

A process from step S1001 to step S1005 is the same as the process from step S701 to step S705 of the first embodiment illustrated in FIG. 7. In step S1005, when a size of an obtained decompression buffer is equal to or larger than a target RAW size, the process proceeds to step S1006. On the other hand, when the target RAW size is larger than the size of the obtained decompression buffer, the process proceeds to step S1008.

In step S1006, it is determined whether a compressed image corresponding to the obtained decompression buffer and a target compressed image are on the same scan line. Specifically, it is determined whether ranges from maximum values to minimum values of the compressed images in a Y coordinate of BoundingBox overlap with each other. This determination is made to suppress occurrence of a rendering defect caused by conflict between decompression and read of the compressed images in the rendering module 203 when the compressed images having the same specified address are on the same scan line. When the compressed image corresponding to the obtained decompression buffer and the target compressed image are not on the same scan line, the process proceeds to step S1007. Otherwise, the process proceeds to step S1008.

In step S1007, it is determined whether the target compressed image strides a band boundary. When the determination is affirmative, different rendering processors process different upper and lower bands. Therefore, the rendering defect is suppressed by specifying different decompression buffers for different bands. When the target compressed image strides a band boundary, the process proceeds to step S1008. On the other hand, when the target compressed image does not stride a band boundary, the process proceeds to step S1010.

A process after step S1008 onwards is the same as the process after step S707 onwards of the first embodiment illustrated in FIG. 7. Specifically, when an unprocessed obtained decompression buffer is detected, the unprocessed obtained decompression buffer is determined as an obtained decompression buffer serving as a next comparison target and a comparison with a target RAW size is performed again (step S1008). In step S1009, a memory region for decompression of the target compressed image is secured by the target RAW size, and an address of the secured memory region is specified as an address of a decompression buffer for the target compressed image. Furthermore, in step S1010, the address of the obtained decompression buffer used in the comparison in step S1005 is specified as an address of a decompression buffer for decompression of the target compressed image. Specifically, the same memory region is used as the decompression buffer again.

The fill information generation process according to this embodiment will be described in detail hereinafter taking a case of a page illustrated in FIG. 6 as an example.

First, a preceding image object does not exist for the leading image object Obj_A (No in step S1004), and therefore, a memory region corresponding to a RAW size of 4.7 KB is newly secured and an address (0x00010000) of a decompression buffer for Obj_A is specified.

Subsequently, in a case of Obj_B, the decompression buffer has been obtained for the preceding object Obj_A (Yes in step S1004), and therefore, a size of the decompression buffer (4.7 KB) is compared with a RAW size of Obj_B, that is, 3.5 KB (step S1005). As a result of the comparison, the size of the obtained decompression buffer is larger (Yes in step S1005), and therefore, it is determined whether Obj_A corresponding to the obtained decompression buffer is on the same scan line. Here, Obj_A has a range in a Y coordinate from 10 to 40, and Obj_B has a range in the Y coordinate from 20 to 50 (refer to the table of FIG. 8). In this case, since the ranges overlap with each other in a range from 20 to 40, it is determined that Obj_A is on the same scan line (Yes in step S1006). Since an unprocessed obtained decompression buffer does not exist (No in step S1008), a memory region corresponding to the RAW size of Obj_B, that is, 3.5 KB, is newly secured and an address (0x00020000) of a decompression buffer for Obj_B is specified (step S1009).

Subsequently, in a case of Obj_C, the decompression buffers have been obtained for the preceding objects Obj_A and Obj_B (Yes in step S1004), and therefore, first, a size of the decompression buffer (4.7 KB) of Obj_A is compared with a RAW size of Obj_C, that is, 4.7 KB (step S1005). As a result of the comparison, the sizes are equal to each other (Yes in step S1005), and therefore, it is determined whether Obj_A corresponding to the obtained decompression buffer is on the same scan line. Here, Obj_A has the range in the Y coordinate from 10 to 40, and Obj_C has a range in the Y coordinate from 50 to 80. In this case, the ranges do not overlap with each other, and therefore, it is determined that Obj_A is not on the same scan line (No in step S1006). The process proceeds to step S1007. In step S1007, it is determined whether Obj_C strides a band boundary. Since Obj_C strides a boundary between bands 1 and 2 (refer to the table of FIG. 8), and therefore, the process proceeds to step S1008 (Yes in step S1007). Since an unprocessed obtained decompression buffer does not exist (No in step S1008), a memory region corresponding to the RAW size of Obj_C, that is, 4.7 KB, is newly secured and an address (0x00030000) of a decompression buffer for Obj_C is specified (step S1009).

Subsequently, in a case of Obj_D, the decompression buffers have been obtained for the preceding objects Obj_A to Obj_C (Yes in step S1004), and therefore, first, the size of the decompression buffer (4.7 KB) of Obj_A is compared with a RAW size of Obj_D, that is, 4.7 KB (step S1005). As a result of the comparison, the sizes are equal to each other (Yes in step S1005), and therefore, it is determined whether Obj_A corresponding to the obtained decompression buffer is on the same scan line. Here, Obj_A has the range in the Y coordinate from 10 to 40, and Obj_D has a range in the Y coordinate from 70 to 100. In this case, the ranges do not overlap with each other, and therefore, it is determined that Obj_A is not on the same scan line (No in step S1006). Then the process proceeds to step S1007. In step S1007, it is determined whether Obj_D strides a band boundary. Obj_D only belongs to the band 2 (refer to the table of FIG. 8) and does not stride a band boundary (No in step S1007), and therefore, the process proceeds to step S1010. As a result, the address of the decompression buffer for Obj_A (0x00010000) is specified as an address of a decompression buffer for Obj_D.

Subsequently, in a case of Obj_E, the decompression buffers have been obtained for the preceding objects Obj_A to Obj_D (Yes in step S1004), and therefore, first, the size of the decompression buffer of Obj_A (4.7 KB) is compared with a RAW size of Obj_E, that is, 4.7 KB (step S1005). As a result of the comparison, the sizes are equal to each other (Yes in step S1005), and therefore, it is determined whether Obj_A corresponding to the obtained decompression buffer is on the same scan line. Here, Obj_A has the range in the Y coordinate from 10 to 40, and Obj_E has a range in the Y coordinate from 130 to 160. In this case, the ranges do not overlap with each other, and therefore, it is determined that Obj_A is not on the same scan line (No in step S1006). Then the process proceeds to step S1007. In step S1007, it is determined whether Obj_E strides a band boundary. Obj_E only belongs to the band 3 (refer to the table of FIG. 8) and does not stride a band boundary (No in step S1007), and therefore, the process proceeds to step S1010. As a result, the address of the decompression buffer for Obj_A (0x00010000) is specified as an address of a decompression buffer for Obj_E. Note that the specified destination address in this case may be the same as the address of the decompression buffer for Obj_C, that is, "0x00030000".

Lastly, in a case of Obj_F, the decompression buffers have been obtained for the preceding objects Obj_A to Obj_E (Yes in step S1004), and therefore, first, the size of the decompression buffer (4.7 KB) of Obj_A is compared with a RAW size of Obj_F, that is, 7.0 KB (step S1005). As a result of the comparison, the RAW size of Obj_F is larger (No in step S1005), and therefore, the process proceeds to step S1008. Thereafter, although the same process is performed on the remaining objects Obj_B to Obj_E, the obtained decompression buffer sizes are not equal to or larger than the RAW size of Obj_F, and therefore, the process proceeds to step S1009. Then a memory region corresponding to the RAW size of Obj_F, that is, 7.0 KB is newly secured and an address (0x00040000) of a decompression buffer for Obj_F is specified.

The description above is summarized in a table of FIG. 11. Although the decompression buffers are newly secured for Obj_A to obj_C and Obj_F, the address of the decompression buffer for Obj_A is also specified for Obj_D and Obj_E. Accordingly, the same memory region is used for a larger number of objects in a shared manner when compared with the first embodiment.

Next, the band parallel rendering process according to this embodiment will be described. As described above, the rendering module 203 analyzes a DL generated for a page using the RIP 111 in response to an instruction issued by the CPU 101 so as to generate bitmap image data. In this case, in the RIP 111, the first rendering processor 411 and the second rendering processor 412 individually generate bitmap image data of regions in the DL generated for each page in parallel (step S507 in the flowchart of FIG. 5).

The rendering module 203 generates the bitmap image data for each scan line from an upper portion of the page based on intermediate data (the DL) generated by the intermediate data generation module 202 using the RIP 111. In this case, the page is divided in a unit of a predetermined region (a band height), the first rendering processor 411 processes odd-numbered band regions and the second rendering processor 412 processes even-numbered band regions so as to generate bitmap image data. Specifically, while reading the shared intermediate data, the first rendering processor 411 and the second rendering processor 412 operate in parallel and render the assigned regions.

Figure 10:
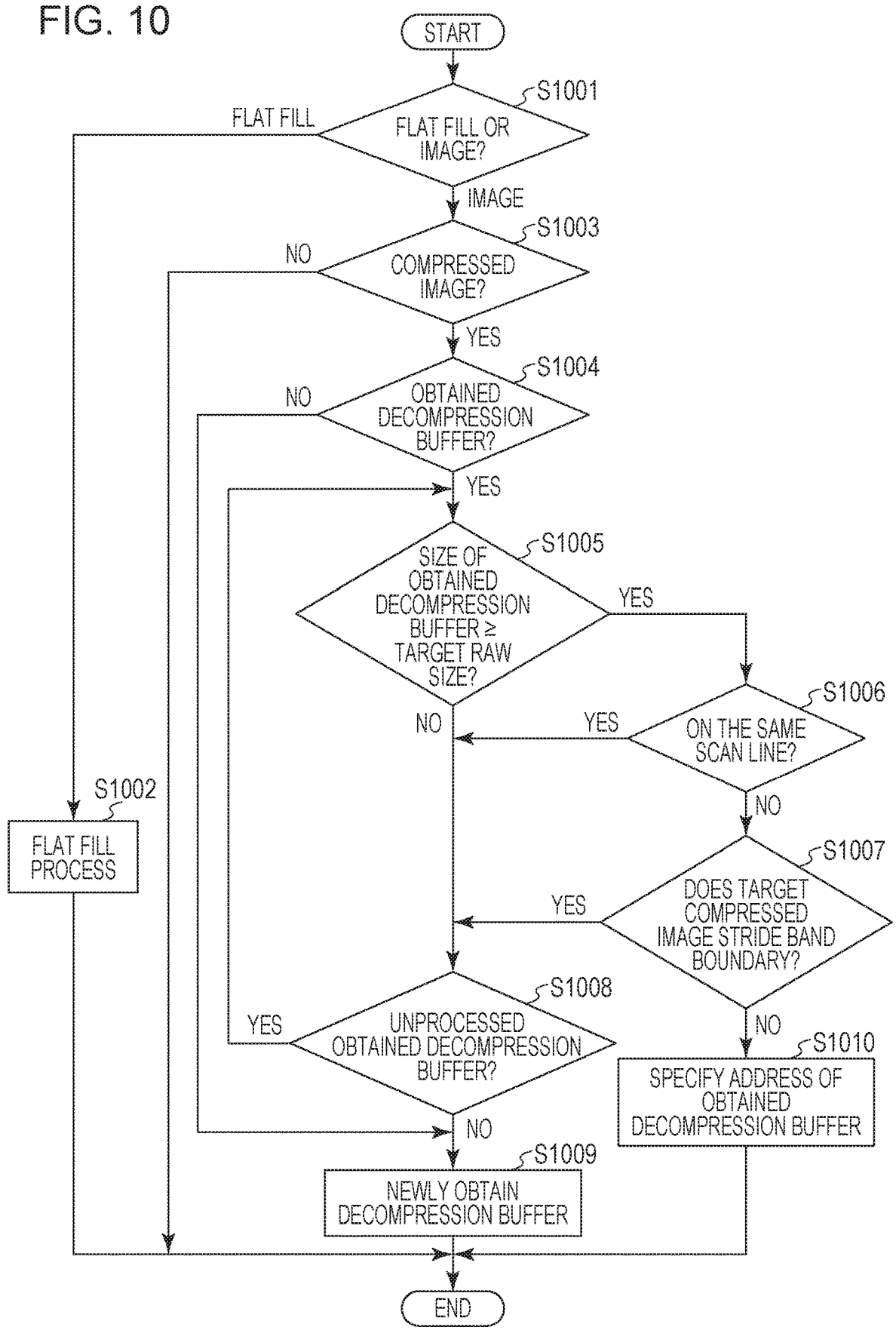
FIG. 10 is a flowchart illustrating a fill information generation process in detail according to a second embodiment.

The RIP 111 reads a compressed image decompression command of the DL and performs decompression in the decompression buffer address specified by the flowchart of FIG. 10 described above. The decompression process in this case is performed only by the first rendering processor 411 connected to the decompression processor 413. The second rendering processor 412 reads a result of the decompression performed by the first rendering processor 411 using the decompression processor 413 with reference to the specified decompression buffer address. Accordingly, the second rendering processor 412 determines whether a RAW image to be read has been decompressed in a predetermined decompression buffer address. Furthermore, the first rendering processor 411 determines whether the predetermined decompression buffer address is being referred to (being accessed) by the second rendering processor 412 before issuing the decompression instruction to the decompression processor 413. In this embodiment, the memory reduction rate is improved while the parallelism of the band parallel rendering process is lowered taking the points described above into consideration. Specifically, the rendering module 203 controls a timing of decompressing a compressed image as below.

Figure 12:
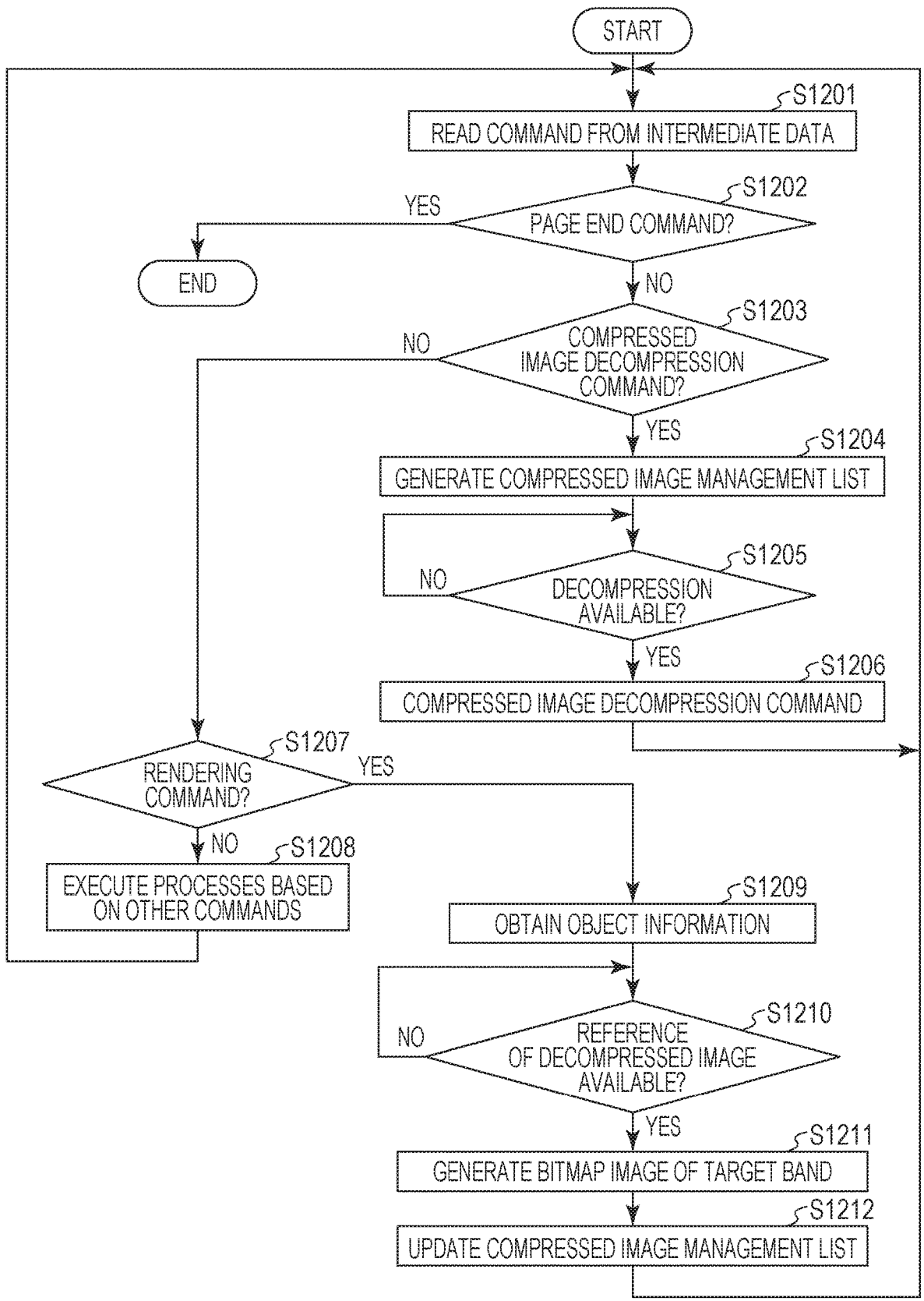
FIG. 12 is a flowchart illustrating a flow of a rendering process performed by a first rendering processor according to the second embodiment.

First, a rendering process performed on a first band (an odd-numbered band) by the first rendering processor 411 will be described. FIG. 12 is a flowchart of a flow of the rendering process performed by the first rendering processor 411 according to this embodiment.

In step S1201, the first rendering processor 411 reads one command included in the generated DL. FIG. 13 is a diagram illustrating a DL generated for the page illustrated in FIG. 6. In a DL 1300, a command to be read is managed by a pointer, and commands are sequentially read from a leading instruction (a rendering frame setting command 1301 corresponding to the rendering start command 300). When the read of the command designated by the pointer is completed, the pointer moves to a next command. In this way, the commands included in the DL are sequentially read. Hereinafter, the following description is made based on the DL 1300 illustrated in FIG. 13.

In step S1202, it is determined whether the command read in step S1201 is a page end command 1313 (corresponding to a rendering end command 340). When the determination is negative, the process proceeds to step S1203. On the other hand, when the determination is affirmative, this process is terminated.

In step S1203, it is determined whether the command read in step S1201 is a compressed image decompression command 1303. When the determination is affirmative, the process proceeds to step S1204, and otherwise, the process proceeds to step S1207.

In step S1204, a compressed image management list is generated based on the read compressed image decompression command. FIG. 14A is an example of the compressed image management list (hereinafter simply referred to as a "list") generated in response to the reading of the compressed image decompression command 1303 and a compressed image decompression command 1304 in the DL of FIG. 13. In the list, a term "decompression number" indicates order of issuance of a decompression instruction to the decompression processor 413. A term "memory size after decompression" indicates a data size of a RAW image obtained after a compressed image is decompressed. A term "buffer address of decompression destination" indicates a decompression buffer address included in the DL. Terms "first rendering processor reference state" and "second rendering processor reference state" indicate information representing whether the rendering processors are to be referred to the decompressed RAW image. Specifically, the information indicates one of two states including "reference" or "no reference". In this case, the state "no reference" corresponds to two cases, that is, a case where a target RAW image is out of a region (a band) to be processed and a case where a bitmap image has been generated and therefore reference of the RAW image is not required in subsequent processes. The information on a reference state is held by a flag or the like such that "reference" corresponds to "0" and "no reference" corresponds to "1". Note that "reference (0)" is set as an initial value.

In step S1205, it is determined whether the read compressed image decompression command is processable based on information on the compressed image management list. This determination is made to prevent a rendering defect from occurring in advance by normally processing a next command. Monitoring of the compressed image management list is continued until execution of the decompression process becomes available. This monitoring process will be described in detail in a description of the rendering process performed by the second rendering processor 412.

In step S1206, an instruction is issued to the decompression processor 413 to decompress the compressed image in a decompressed image storage memory 420. When the decompression instruction is issued, the process returns to step S1201 so that a subsequent command is read. In response to the decompression instruction, the decompression processor 413 performs the process of decompressing the compressed image and stores the number of decompression instructions corresponding to completed processes (the number of compressed images which have been decompressed) in an internal register. An initial value of the internal register is 0, and is reset to 0 when this flow is terminated.

In step S1207, it is determined whether the command read in step S1201 is a rendering command. When the read command is a rendering command 1305, for example, the process proceeds to step S1209, and otherwise, the process proceeds to step S1208.

In step S1208, a process based on another command which has been read, that is, a rendering frame setting command 1301 or a rendering region setting command 1302, for example, is executed. After the predetermined process is completed, the process returns to step S1201 where a next command is read.

In step S1209, information on an object associated with the read rendering command 1305 is obtained. Specifically, edges (contour of an object) on scanning lines are calculated in accordance with information on a path point sequence included in the rendering command 1305, and furthermore, a bitmap image used to fill the object is determined based on a fill type and a decompression number.

In step S1210, it is determined whether a decompressed image (a RAW image) having a decompression number designated by the read rendering command is in a reference available state. This determination is performed based on the decompression number in the compressed image management list and the value of the internal register included in the decompression processor 413. Specifically, when the value of the internal register indicating the number of compressed images which have been subjected to the decompression process is equal to or larger than the decompression number designated by the read rendering command with reference to the compressed image management list, it is determined that the decompression process is completed. When the value of the internal register indicating the number of compressed images which have been subjected to the decompression process is smaller than the decompression number designated by the read rendering command, the determination process in step S1210 is repeatedly performed at a certain interval until the value becomes equal to the decompression number. When the value becomes equal to the decompression number, the process proceeds to step S1211.

In step S1211, a bitmap image corresponding to an odd-numbered band to be processed is generated using a RAW image included in the decompressed image storage memory 420 as fill information.

In step S1212, the compressed image management list is updated. Specifically, in the odd-numbered bands in which generation of a bitmap image is completed, when a RAW image which is not to be referred to in a next process onwards exists, a reference state of the RAW image is changed from "reference" to "no reference". For example, the list illustrated in FIG. 14A is updated to a list of FIG. 14B when the process of generating a bitmap image based on the rendering commands 1305 and 1306 is completed. Specifically, information in "first rendering processor reference state" is changed from "reference" to "no reference (referenced)" in a decompression number 1 corresponding to Obj_A and a decompression number 2 corresponding to Obj_B. When the update of the list is completed, the process returns to step S1201 where a next command is read.

The rendering process performed by the first rendering processor 411 has been described above.

Second, a rendering process performed on a second band (an even-numbered band) by the second rendering processor 412 will be described. FIG. 15 is a flowchart of a flow of the rendering process performed by the second rendering processor 412 according to this embodiment. This rendering process is different from that performed by the first rendering processor 411 in accordance with the flowchart of FIG. 12 in that step 1204 to step 1206 are omitted. Specifically, all decompression instructions based on compressed image decompression commands are processed by the first rendering processor 411, and the second rendering processor 412 uses results of the decompression processes performed by the first rendering processor 411 in step S1507 onwards. Hereinafter, characteristic portions of this flow are mainly described.

A process from step S1501 to step S1503 corresponds to the process from step S1201 to step S1203 described above. When a command read in step S1501 is a compressed image decompression command (Yes in step S1503), the process returns to step S1501 where a next command is processed in this flowchart.

A process from step S1504 to step S1509 corresponds to the process from step S1207 to step S1212 described above. When a process of generating a bitmap image corresponding to an even-numbered band to be processed is completed by the process performed until step S1508, the compressed image management list is updated in step S1509. FIG. 14C is a list obtained when the second rendering processor 412 is processing the band 2 and the first rendering processor 411 starts processing on the band 3 after completing processing on the band 1. At this time point, the first rendering processor 411 has read a rendering command of Obj included in the band 3, and the second rendering processor 412 refers to a RAW image obtained by decompressing Obj included in the band 2.

Here, a decompression buffer address "0x00010000" is specified for a compressed image of Obj_D included in the band 2 and a compressed image of Obj_E included in the band 3 (refer to the table in FIG. 11). Accordingly, when the first rendering processor 411 issues an instruction for decompressing the compressed image of Obj_E to the decompression processor 413 while the second rendering processor 412 refers to a result of the decompression of Obj_D (RAW image), the decompression result of Obj_D is inappropriately updated. Therefore, the first rendering processor 411 determines whether another compressed image having a decompression destination the same as that of a compressed image to be decompressed exists in step S1205 as described above with reference to the "second rendering processor reference state" in the list. For example, since a decompression number 5 and a decompression number 4 have the same decompression buffer address, the first rendering processor 411 performs monitoring and waiting until the "second rendering processor reference state" of the reference number 4 indicates "no reference".

The rendering process performed by the second rendering processor 412 has been described above.

As described above, according to this embodiment, by managing completion of reference of a decompression result using the compressed image management list, a memory is prevented from being updated in a state in which the reference is not completed while a reference result which has been referred to is immediately discarded. Accordingly, a memory reduction rate may be improved while the parallelism of the band parallel rendering is degraded.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-184459 filed Sep. 21, 2016, which is hereby incorporated by reference herein in its entirety.

What is claimed is:

1. An image processing apparatus comprising:
at least one processor configured to:
receive print data of a page including a first compressed image and a second compressed image succeeding the first compressed image;
decompress the first compressed image included in a first band of the print data;
store, in a first memory area of a buffer, a first decompressed image which is obtained by decompressing the first compressed image;
determine if the second compressed image is included in a band away from the first band;
allocate, in a case that it is determined that the second compressed image is included in the band away from the first band, a memory area that overlaps with the first memory area in the buffer for a decompression result of the second compressed image;
allocate, in a case that it is determined that the second compressed image is included in the band, which is not away from the first band, but is same as or adjacent to the first band, a memory area that does not overlap with the first memory area in the buffer for a decompression result of the second compressed image.

2. The image processing apparatus according to claim 1, wherein the print data is described in the page description language.

* * * * *